May 7, 1929.　　F. W. CUTLER　　1,711,834
SORTING TABLE
Filed Dec. 12, 1925
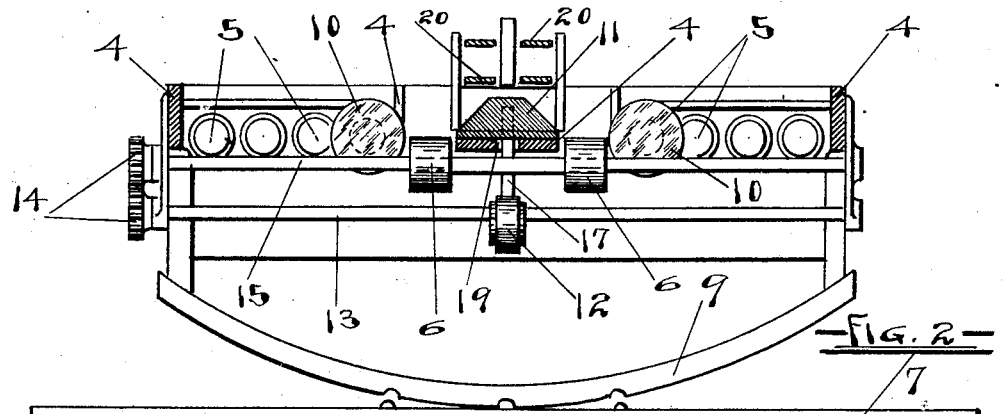
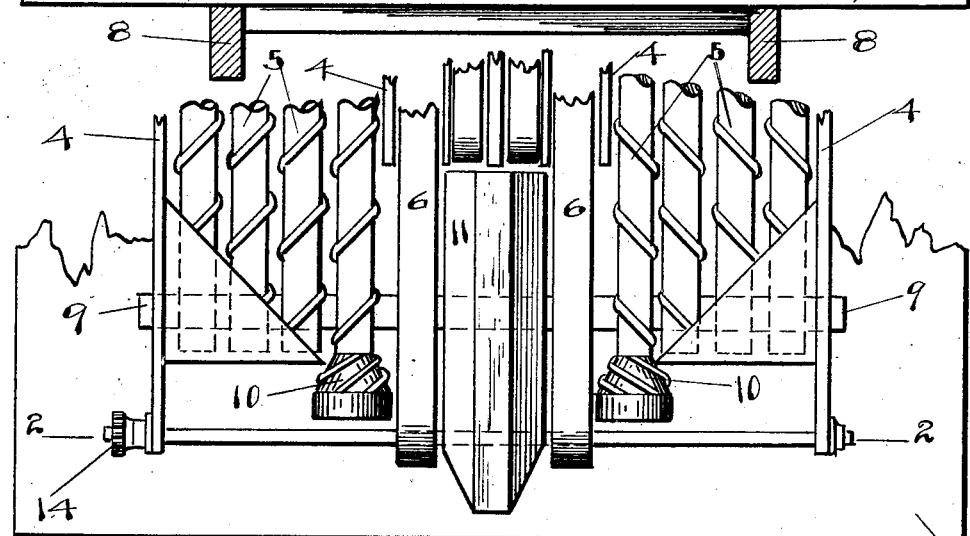
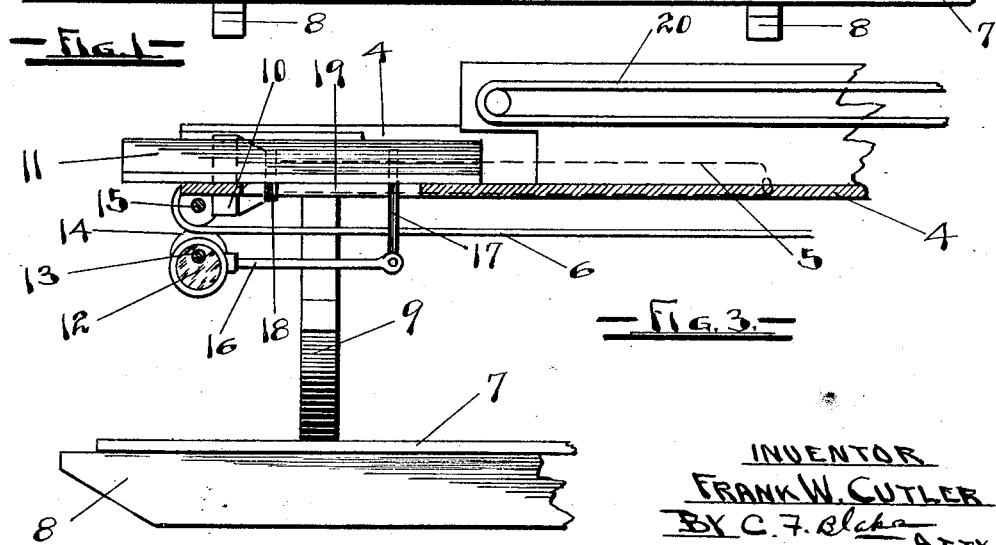
INVENTOR
FRANK W. CUTLER
BY C. F. Clark
ATTY.

Patented May 7, 1929.

1,711,834

UNITED STATES PATENT OFFICE.

FRANK W. CUTLER, OF PORTLAND, OREGON, ASSIGNOR TO CUTLER MANUFACTURING COMPANY, OF PORTLAND, OREGON, A PARTNERSHIP.

SORTING TABLE.

Application filed December 12, 1925. Serial No. 75,130.

My invention relates to sorting tables in general, and particularly to fruit sorting tables, the object being to provide such improvements therein as will adapt such tables to use in the field or orchard, so that the fruit may be sorted immediately it is gathered without being transported to a packing house. I accomplish this object by means of a combination of separating and leveling devices which separate the fruits as they are passed from the sorting rolls to the conveyor belt, and a leveling device which compensates for unevenness of ground and thus enables said separating mechanism to operate, a preferred form of my device being illustrated in the accompanying drawing, which is a part of this application for Letters Patent, like characters of reference indicating like parts throughout the several views thereof, and in which:

Fig. 1 is a plan view of the front or discharge end of a sorting table with my improvements thereon.

Fig. 2 is a sectional elevation upon line 2—2 of Fig. 1.

Fig. 3 is a transverse sectional elevation of my device.

My improvements are adapted to the well known form of spiral roll sorting table having a frame 4 of vertically disposed members forming longitudinal passageways therebetween, and spirally wound rollers 5 to receive the fruit and spread it out for inspection and manual sorting mounted to rotate within said passageways, and conveyor belts 6 to receive the fruit from the rollers 5 and convey it to receptacles or to grading machines.

This is a well known form of sorting table, and therefore not a part of my invention, so the mounting and operating mechanism for the rolls 5 and belts 6 is not shown in the drawing.

It has been found that unless such a sorting table is perfectly level the fruit congregates at the point of delivery from the rolls 5 to the belts 6, resulting in imperfect delivery of the fruit by the belts 6 and bruising of the fruit as it thus congregates. Also imperfect leveling of the table results in imperfect action of the fruit while upon the sorting rolls 5. It is impractical to level such a table in each direction in the orchard, but it has been found that such a table may be easily operated by a combination of mechanism for preventing said congregation of the fruit and a leveling mechanism for leveling the table transversely.

To transport the table around the orchard I provide a sled with top 7 and runners 8, and the table frame is supported upon rockers 9 mounted upon said sled top, which may be blocked in any position to render the table transversely level. This will insure that the fruit acts properly in passing along the sorting rolls 5 and onto the conveyor 6 at the point of delivery from the sorting rolls. But it has been found that the fruit congregates at such delivery point unless the table is also longitudinally level, which is impractical to accomplish in the orchard, and therefore to overcome the congregation I provide the following mechanically operated mechanism which does not require the table to be longitudinally level.

Upon the front end of the roll 5 adjacent the respective conveyor 6 I provide a conical end with the large end thereof towards the large end of the table, as shown in Fig. 1 at 10. This assists in breaking up the congestion by taking one of a pair of fruit and causing it to move faster than the other as it passes upon the conveyor 6, because one fruit will partially climb the cone 10 and ride upon the larger circumference of the cone, thus traveling faster than the other fruit which passes over the smaller circumference of the roll 5. To still further assist in overcoming the congregation of the fruit I provide a sliding block 11 disposed parallel and adjacent the conveyor belt 6, and having the top beveled towards said belt, as shown in Fig. 2. Said block slides forward and backward upon the frame 4 in position opposite the point of delivery of the fruit from the rolls 5 to the conveyor 6. Said block is operated by an eccentric 12 upon a shaft 13, said shaft 13 being rotated by gears 14 from the conveyor shaft 15. Said conveyor shaft 15 is operated by mechanism not shown in the drawing since it is no part of my invention and is well known to the art. Said eccentric is provided with an arm 16 connected with a pin 17 from the block 11, as shown in Fig. 3, and said block 11 is also provided with a guide 18, both said guide and said pin sliding within a groove 19 in the frame 4 and thus guiding the block 11. If the fruit congregates as it passes upon the conveyor belts 6 the block 11 slightly jars the congregated fruit due to its sliding movement back and forth and this separates the fruit and assists in properly disposing the same upon the conveyor, even if the table is longitudinally out of level.

The usual conveyors 20 upon which the sorters deposit the cull fruit are a part of the table, and are not included in the drawing as a part of my invention.

My invention may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new and desire to secure by Letters Patent is:

1. In a fruit sorting table: a manual sorting table; a conveyor; and a reciprocating member opposite the point of delivery of the fruit from said sorting table to said conveyor for the purpose of preventing congregation of the fruit at said point of delivery.

2. In a fruit sorting table: a roller spirally wound with cord, and a conical head upon the end of said roller to prevent congregation of the fruit as it is delivered from said roller.

3. In a fruit sorting table: a sorting roller spirally wound with cord; a conical head upon the delivery end of said roller; a reciprocating member positioned parallel to said roller; and a conveyor belt intermediate said roller and said member.

4. In a fruit sorting table: sorting rolls; a conveyor to receive fruit from said sorting rolls; and a rotating conical member adapted to impart varying velocities to the pieces of fruit as they pass onto said conveyor, for the purpose of preventing congestion of the fruit at that point.

5. In a fruit sorting table: sorting rolls; a conveyor to receive fruit from said sorting rolls; a reciprocating member to move the fruit slightly as it passes onto said conveyor; and a rotary conical member adapted to impart varying velocities to the fruit as it passes onto said conveyor; said reciprocating member and said conical member coacting to prevent congestion of the fruit as it passes from said sorting rolls onto said conveyor.

In witness whereof I claim the foregoing as my own I hereunto affix my signature at Portland, county of Multnomah, State of Oregon.

FRANK W. CUTLER.